United States Patent [19]

Hayashi

[11] Patent Number: 5,896,008
[45] Date of Patent: *Apr. 20, 1999

[54] ELECTRO-OPTICAL DEVICE

[75] Inventor: Masatake Hayashi, Kanagawa, Japan

[73] Assignee: Sony Corporation, Tokyo, Japan

[*] Notice: This patent is subject to a terminal disclaimer.

[21] Appl. No.: 08/780,544

[22] Filed: Jan. 9, 1997

Related U.S. Application Data

[62] Division of application No. 08/559,060, Nov. 16, 1995, Pat. No. 5,627,431.

[51] Int. Cl.$^6$ .................................................. H01J 17/58
[52] U.S. Cl. .......................... 313/584; 313/586; 313/494; 345/60; 345/87
[58] Field of Search ................................ 313/584, 586, 313/494; 345/60, 87

[56] References Cited

U.S. PATENT DOCUMENTS

| | | |
|---|---|---|
| 3,881,129 | 4/1975 | Nakayama et al. . |
| 3,894,264 | 7/1975 | Andoh et al. . |
| 4,048,533 | 9/1977 | Hinson et al. . |
| 4,562,434 | 12/1985 | Amano . |
| 4,728,864 | 3/1988 | Dick . |
| 4,896,149 | 1/1990 | Buzak et al. . |
| 5,077,553 | 12/1991 | Buzak . |
| 5,107,182 | 4/1992 | Sano et al. . |
| 5,182,489 | 1/1993 | Sano . |

FOREIGN PATENT DOCUMENTS 0217396  8/1989  Japan .

*Primary Examiner*—Ashok Patel
*Attorney, Agent, or Firm*—Hill & Simpson

[57] ABSTRACT

An electro-optical device has a first substrate having non-overlapping first electrodes on a major surface thereof and a second substrate opposed to the first substrate having non-overlapping second electrodes on a major surface thereof. The second electrodes are disposed substantially perpendicular to the first electrodes, and adjacent second electrodes are disposed at equal intervals. The electro optical device has an electro-optical material layer disposed between the first and second substrates. A discharge chamber is disposed between the electro-optical material layer and the second substrate and is filled with an ionizable gas. When this electro-optical device is applied to an image display device, the number of electrodes for attaining the same resolution can be reduced to one half. Thus, a bright image display is provided. Further, the electro-optical device may be if a structure such that partition walls are formed by the printing method on the second electrodes.

4 Claims, 3 Drawing Sheets

5,896,008

ELECTRO-OPTICAL DEVICE

This is a division of application Ser. No. 08/559,060, filed Nov. 16, 1995 now U.S. Pat. No. 5,627,431.

BACKGROUND OF THE INVENTION

This invention relates to an electro-optical device applied as an image display device to drive an electro-optical material layer by making use of plasma, thus to carry out selection of pixels.

As the means for allowing, e.g., a liquid crystal display to have high resolution and high contrast, there is generally carried out a method in which active elements such as transistors, etc. are provided every display pixels to drive them (which method is so called an active matrix addressing system).

In this case, however, since it is necessary to provide a large number of semiconductor elements such as thin film transistors, the problem of yield is apprehended particularly when the display area is enlarged, giving rise to the great problem that the cost is necessarily increased.

Thus, as the means for solving this, Buzaku et al. have proposed in the Japanese Laid Open Application No. 217396/89 publication a method utilizing discharge plasma in place of semiconductor elements such as MOS transistors or thin film transistors, etc. as an active element.

The configuration of an image display device for driving a liquid crystal by making use of discharge plasma will be briefly described.

In this image display device, as shown in FIG. 7, a liquid crystal layer 101 serving as an electro-optical material layer and plasma chambers 102 are adjacently arranged through a thin dielectric sheet 103 comprised of glass, etc.

The plasma chambers 102 are constituted by forming a plurality of grooves 105 in parallel to each other in a glass substrate or base plate 104. Within these chambers, ionizable gas is filled. Further, pairs of electrodes 106 and 107 in parallel to each other are provided at respective grooves 105. These electrodes 106 and 107 function as an anode and a cathode for ionizing gas within the plasma chambers 102 to generate discharge plasma.

For example, the electrodes 106 function as an anode, and are commonly wired and grounded. Further, the electrodes 107 function as a cathode, and are connected to transistors through current limiting resistors.

On the other hand, the liquid crystal layer 101 is held by the dielectric sheet 103 and a transparent substrate 108. On the surface at the liquid crystal layer 101 side of the transparent substrate 108, transparent electrodes 109 are formed. These transparent electrodes 109 are perpendicular to the plasma chambers constituted by the grooves 105. The portions where the transparent electrodes 109 and the plasma chambers 102 intersect with each other correspond to respective pixels.

In the above-mentioned image display device, pulse voltages are applied in sequence to electrodes 107 serving as the cathode by ON/OFF of the transistors, whereby discharge plasma takes place in a time series manner by discharge between the electrodes 106 and 107 in respective plasma chambers 102. Then, by switching and scanning in sequence the plasma chambers 102 where plasma discharge is carried out by ON/OFF of the transistors, and applying signal voltages to the transparent electrodes 109 on the liquid crystal layer 101 side in synchronism with the switching scan operation, these signal voltages are held by respective pixels. The liquid crystal layer 101 is thus driven.

Accordingly, the grooves 105, i.e., plasma chambers 102 respectively correspond to one scanning lines, and two kinds of electrodes of an anode and a cathode are required every scanning unit.

Meanwhile, since image display devices of this kind carry out the operation as an optical shutter in the state where these electrodes 106 and 107 are included in the display region as well, in the case where the electrodes 106 and 107 are formed by, e.g., opaque material such as metal, light at these portions is absorbed or reflected. This is an obstacle to an effective operation as an optical shutter. In actual terms, the above-mentioned image display devices involve the great problem that existence of these electrodes 106 and 107 lowers transmissivity or transmission factor, thus degrading brightness of the image display device.

Accordingly, it is desirable to adopt a method of forming these electrodes 106 and 107 by a transparent material, or a method of narrowing the stripe width, etc. thereby holding down lowering of the transmissivity to a minimum level.

However, because there actually exists occurrence of sputter phenomenon followed by plasma discharge, a metal film such as Ni, etc. must be used as an electrode material.

Further, it is obvious that the method of narrowing the stripe width of the electrodes 106 and 107 has a limit particularly in the case of forming a high resolution and high density pattern in order to avoid occurrence of defects due to breakage at the time of manufacturing or at the time of operation.

As stated above, in the conventional image display devices, improvement in transmissivity and requirement of high resolution are contrary to each other.

SUMMARY OF THE INVENTION

With the actual circumstances in view, this invention has been proposed, and its object is to provide an electro-optical device applied as an image display device, which is capable of improving transmissivity and of providing high resolution without altering electrode material or stripe width.

To achieve the above-mentioned object, in accordance with this invention, there is provided an electro-optical device comprising: a first substrate having a plurality of non-overlapping first electrodes on a major surface thereof; a second substrate opposed to the first substrate and having a plurality of non-overlapping second electrodes on a major surface thereof, the second electrodes being disposed substantially perpendicular to the first electrodes, adjacent second electrodes being disposed at equal intervals; an electro-optical material layer disposed between the first and second substrates; and a discharge chamber disposed between the electro-optical material layer and the second substrate, and filled with an ionizable gas.

An electro-optical device may further include a dielectric material layer disposed between the electro-optical material layer and the discharge chamber.

In an electro-optical device, the discharge chamber has a plurality of scanning units, each of the scanning units comprising a discharge region of a localized volume of ionized gas so that at least two scanning units are formed as a continuous space. It is preferable that the discharge region of all scanning units is formed as a continuous space.

Alternatively, each scanning unit may be defined by partition walls formed on the second electrode.

An electro-optical device may further include fine particles on the second electrodes.

In addition, there is provided an addressing structure comprising: a substrate having a plurality of electrodes on a Major surface thereof, adjacent electrodes being disposed at equal intervals; a dielectric material layer opposed to the substrate; and an ionizable gas filled between the substrate and the dielectric material layer, the ionizable gas defining a discharge region as an addressing element.

In the electro-optical device of this invention, discharge electrode stripes (second electrodes) are formed at the same pitch as the scanning unit pitch, and respective electrode stripes carry out to function as the anode and to function as the cathode in a time series manner.

Accordingly, the number of electrode stripes required per each scan unit is reduced to one half. Thus, even in the case where resolution is caused to be high, transmitivity is ensured.

DESCRIPTION OF THE PREFERRED EMBODIMENT

An embodiment to which this invention is applied will now be described in detail with reference to the attached drawings.

An electro-optical device applied to an image display device employed in this embodiment is of the so-called open cell structure in which all discharge regions are formed as a continuous space. Accordingly, there exists no partition walls partitioning the discharge region.

Figure 1:
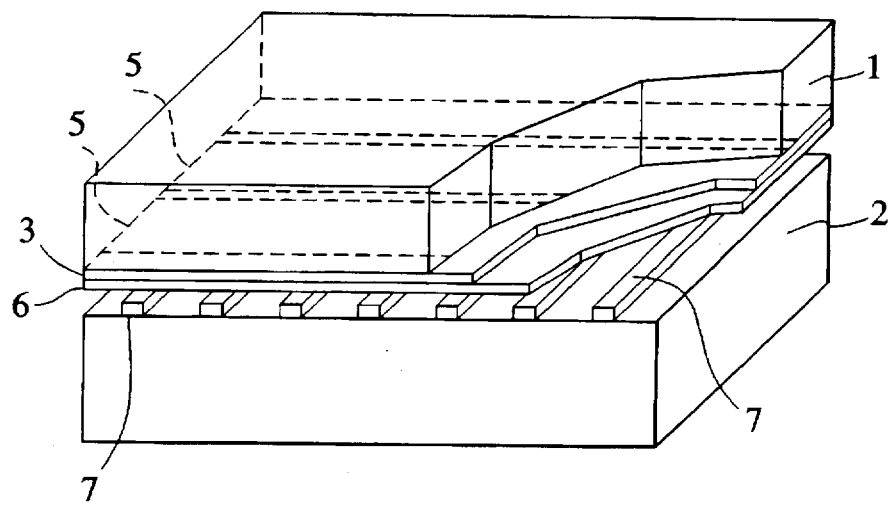
FIG. 1 is an essential part schematic perspective view showing, in a manner partially broken manner, an embodiment of an image display device to which an electro-optical device according to this invention is applied.
Figure 2:
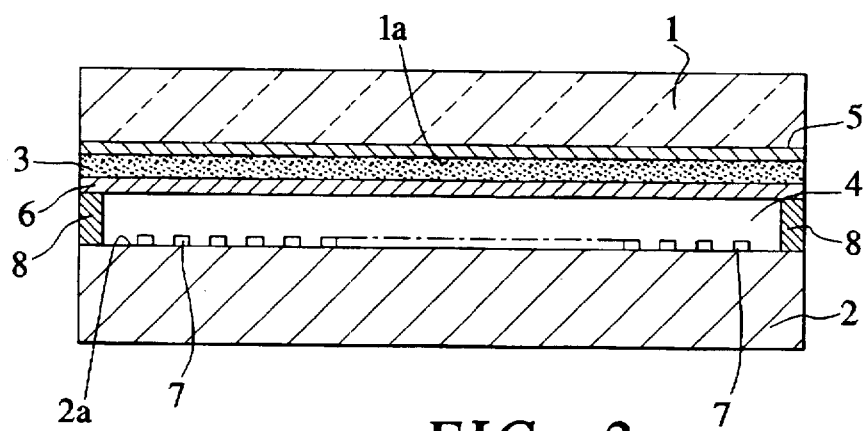
FIG. 2 is an essential part schematic cross sectional view of the embodiment shown in FIG. 1.

The configuration of the electro-optical device applied to an image display device of this embodiment will be first described. In the electro-optical device of this embodiment, as shown in FIGS. 1 and 2, a liquid crystal layer 3 serving as an electro-optical material layer is inserted between a flat and sufficiently optically transparent first base plate 1 and a similarly flat and transparent second base plate 2, and a space between the liquid crystal layer 3 and the second substrate 2 is utilized as a discharge chamber 4.

In this embodiment, these substrates 1 and 2 are both formed by a non-conductive and optically transparent material by taking into consideration the case where the image display device in this embodiment is of the transmission type. However, in the case where the image display device is constructed as a direct-viewing or reflection type display device, it is sufficient that either one substrate is transparent.

Belt-shaped electrodes 5 are formed on one major surface 1a of the first substrate 1, and a liquid crystal layer 3 comprised of a nematic liquid crystal, etc. is arranged in contact with the electrodes 5. This liquid crystal layer 3 is held by a thin dielectric film 6 comprised of glass, mica, or plastic, etc. between the thin dielectric film 6 and the first substrate 1. In this embodiment, there is employed a configuration in such a form that a so called liquid crystal cell is constituted by the first substrate 1, the liquid crystal layer 3, and the dielectric film 6.

The above-mentioned dielectric film 6 functions as an insulating shield layer of the liquid crystal layer 3 and the discharge region 4. If there is no dielectric film 6, there is the possibility that the liquid crystal material may flow into the discharge region 4, or the liquid crystal material may be contaminated by gas within the discharge region 4. It is to be noted that in the case where a solid-state or encapsulated electro-optical material, etc. is used in place of the liquid crystal material, there are instances where such a dielectric film 6 is not required.

In addition, since the dielectric film 6 is formed by dielectric material, the dielectric film 6 itself also functions as a capacitor. Accordingly, in order to sufficiently ensure the electric coupling between the discharge region 4 and the liquid crystal layer 3 and to suppress a two-dimensional diffusion of charges, it is desirable that the dielectric film 6 is as thin as possible.

On the other hand, discharge electrodes 7 are formed as a belt-shaped electrode also on the second substrate 2. Further, by supporting the peripheral portions of the second substrate 2 by means of spacers 8, it is arranged with a predetermined spacing from the dielectric film 6. Thus, a space between the second substrate 2 and the dielectric film 6 is caused to serve as a discharge chamber 4 generating discharge plasma. Accordingly, the discharge regions 4 are a space continuous in the entire display area. More particularly, the discharge chamber 4 has a plurality of scanning units, and each of the scanning units comprises a discharge region of a localized volume of ionized gas. While, in this embodiment, the discharge region of all scanning units is formed as a continuous space as described above, each scanning unit may comprise a discharge region of a localized volume of ionized gas so that at least two scanning units are formed as a continuous space.

Ionizable gas is filled within the discharge regions 4. As the ionizable gas, helium, neon, argon, mixture gas thereof, or the like may be used.

The outline of the configuration of the electro-optical device applied to an image display device of this embodiment has been described as above. On the respective substrates 1 and 2, electrodes for driving the liquid crystal layer 3 are formed, respectively. The configuration of these electrodes and the display operation will now be described.

On the major surface 1a opposite to the second substrate 2 of the first substrate 1, a plurality of belt-shaped electrodes 5 having a predetermined width are formed in such a manner that they do not overlap with each other. These electrodes 5 are formed by a transparent conductive material, e.g., Indium Tin Oxide (ITO), etc., and are optically transparent. Further, respective electrodes 5 are in parallel to each other and perpendicular to, e.g., the display surface.

On the other hand, also on the major surface 2a opposite to the first substrate of the second substrate 2, discharge electrodes 7 are similarly formed in such a manner that they do not overlap with each other. These discharge electrodes 7 are parallel linear electrodes, but they are arranged in a direction perpendicular to the electrodes 5 formed on the first substrate 1. Namely, these discharge electrodes 7 and the electrodes 5 are in a form such that they constitute a simple XY matrix.

Further, as the discharge electrode 7, single electrodes A, B, C and D are arranged in correspondence with respective scanning units. These electrodes function as an anode or a cathode.

Figure 3:
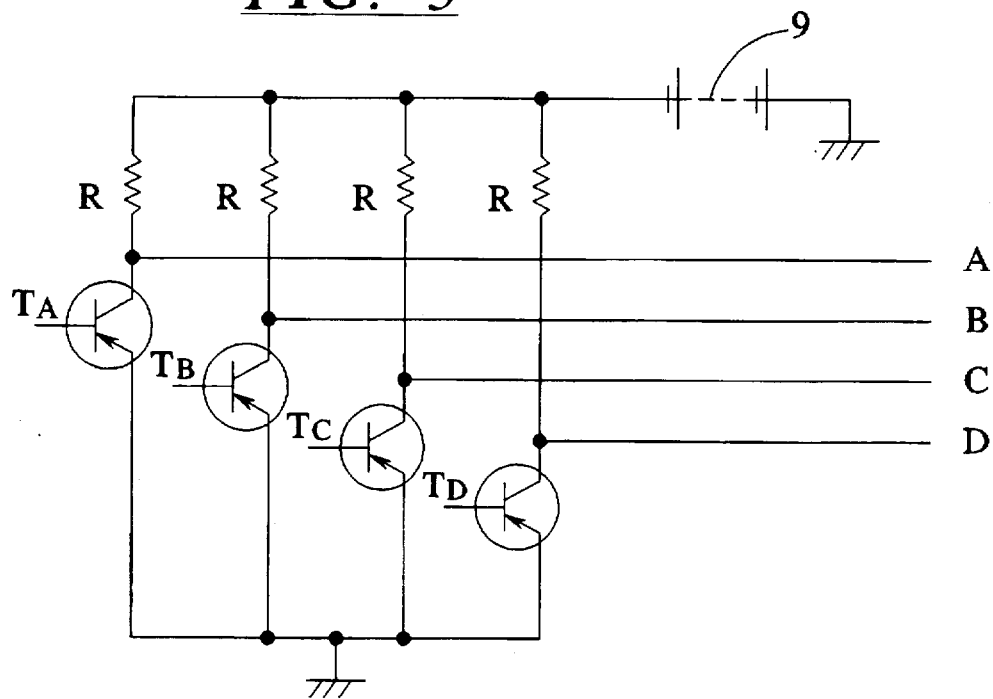
FIG. 3 is a circuit diagram showing a drive circuit for discharge electrodes.
Figure 4A:
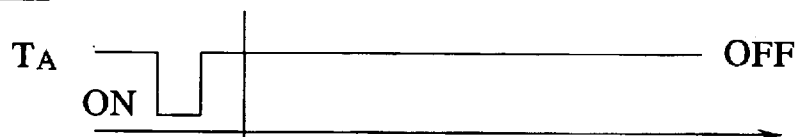
Figs 4A–4D are waveform diagrams of signals delivered to drive transistors for discharge electrodes.
Figure 4B:
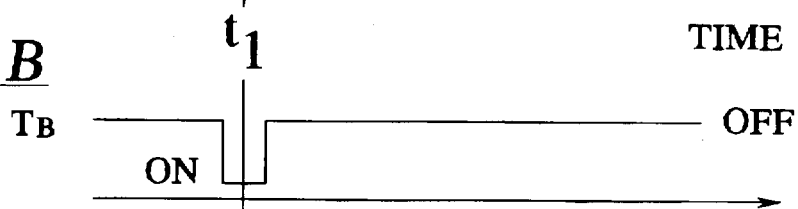
Figure 4C:
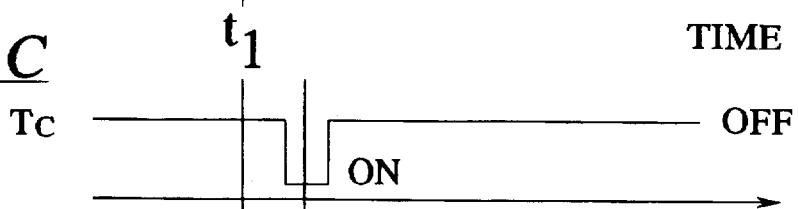
Figure 4D:
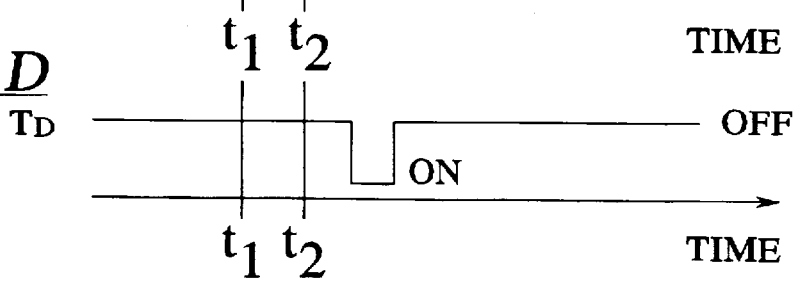

The connecting state of the discharge electrodes 7 is shown in FIG. 3. Here, explanation will be given by taking an example of a drive circuit with respect to four lines.

The electrodes A, B, C and D are respectively connected to a d.c. power supply 9 through resistors R, and are commonly grounded through drive transistors $T_A$, $T_B$, $T_C$ and $T_D$.

Signals such that they are turned ON/OFF in sequence are applied to respective drive transistors $T_A$, $T_B$, $T_C$ and $T_D$ as shown in FIGS. 4A–4D.

considering the operation at time $t_1$, since the drive transistor $T_B$ is turned ON, the electrode B is grounded, and a negative voltage is applied to other electrodes A, C and D by the pull-up resistors R.

Accordingly, at this time $t_1$, the electrode B operates as an anode, and the electrodes A, C and D operate as a cathode.

Here, if the kind or the pressure of a gas filled into the discharge chamber 4, and the distances between electrodes A, B, C and D and the drive voltages thereof, etc. are suitably selected, discharge takes place between the electrodes B and A, and between the electrodes B and C. Thus, discharge plasma is produced.

At time $t_2$, the transistor $T_C$ is turned ON, and other drive transistors $T_A$, $T_B$ and $T_D$ are turned OFF. As a result, the electrode C operates as a cathode, and the electrodes B and D operate as a cathode. Accordingly, discharge takes place between the electrodes C and B, and between the electrodes C and D. Thus, the discharge area is shifted by one scanning unit.

By applying such a signal to be turned ON/OFF in time series manner to drive transistors $T_A$, $T_B$, $T_C$ and $T_D$ in a manner stated above, the discharge plasma region is shifted in succession, and is scanned on the display surface.

In the image display device of the above-described structure, image display is carried out on the basis of the fundamental principle that the liquid crystal 3 function as a sampling capacitor of an analog voltage applied to the electrodes 5 formed on the fist substrate 1, and discharge plasma regions produced in succession in the discharge regions function as a sampling switch.

This image display operation will now be described. The liquid crystal layer 3 corresponding to respective pixels can be grasped as a capacitor model, and indicate a capacitive liquid crystal cell formed at the portion where the electrodes 5 and the discharge plasma region overlap with each other.

It is now assumed that an analog voltage is applied to respective electrodes 5 by means of a data driver circuit. Here, if no discharge plasma takes place in the vicinity of the discharge electrodes 7 of the second substrate 2, a plasma switch (electrical connection between electrodes 5 and discharge electrode 7 serving as an anode) is placed in an OFF state. Accordingly, even if any analog voltage is applied to the electrodes 5, there is no change in potential differences applied to respective capacitor models.

On the other hand, when a discharge plasma takes place in the vicinity of the discharge electrodes 7 of the second substrate 2, the electrode and the discharge electrode 7 serving as an anode (e.g., electrode B at time $t_1$) are placed in an electrically connected state. From a viewpoint of the circuit, there results the state equivalent to the state where the plasma switch is turned ON.

As a result, an analog voltage delivered to the electrode 5 is stored into the capacitor model. Even after such a discharge plasma is dissipated, this analog voltage remains in the state where it is stored into each capacitor model for a time period until a next strobe operation is carried out (during at least a field interval of that image), and does not undergo influence of subsequent changes of an analog voltage applied to the electrode 5.

Accordingly, when ON/OFF signals are applied in a time series manner to the drive transistors $T_A$, $T_B$, $T_C$ and $T_D$, and a liquid crystal drive signal is applied as an analog voltage to the respective electrodes 5 in synchronism with application of the ON/OFF signals at the same time, the plasma switch functions as an active element in the same manner as in the semiconductor element such as a thin film transistor, etc. Thus, the liquid crystal 3 is driven in a manner similar in the case of the active matrix addressing system.

Meanwhile, in the case of this example, at an arbitrary point within an effective picture, a plurality of discharges are necessarily carried out within one field. The number of discharges is two or more although it depends upon spread of the discharge plasma region.

This might apparently result in degradation in the resolution, but can be neglected for the following reasons.

Consider now the case where the number of the scanning lines is assumed to be 400, and a non-interlaced operation is conducted. Further, consideration is now made in connection with a point in the vicinity of the electrode C as an example of an arbitrary point within an effective picture.

It is here assumed that, in the vicinity of the electrode C, when the drive transistors $T_B$, $T_C$ and $T_D$ are turned ON, supply of charged particles followed by plasma discharge is carried out. Namely, in the vicinity of the electrode C, three addressing operations are assumed to be carried out within one field.

Thus, data at the timing when the drive transistor $T_B$ is turned ON (which is assumed as data B), data at the timing when the drive transistor $T_C$ is turned ON (which is assumed as data C), and data at the timing when the drive transistor $T_D$ is turned ON (which is assumed as data D) are sequentially written into the liquid crystal layer 3 at the portion opposite to the electrode C.

It is to be noted that, in the vicinity of the electrode C, the data B is erased by writing of the data C, and the data C is erased by writing of the data D. On the contrary, data D is left until a next field.

Accordingly, the data B and C is held for a time period of $1/400$ of one field, and the data D is held for a time period of $397/400$ of one field.

Namely, data actually effective or valid as an image is the data D finally written. In this case, crosstalk of $3/400=0.75\%$ only takes place. Even if the discharge plasma region further spreads, spread corresponding to 12 lines is required in order to render a crosstalk of 3%. This is in fact negligible.

As stated above, in the image display device of this embodiment, the number of electrodes required to provide the same resolution can be reduced to one half. For this reason, not only productivity but also transmissivity when viewed as an optical shutter can be improved. As a result, a bright image display can be realized.

Further, when the number of electrodes is assumed to be fixed, the resolution can become equal to a value twice greater than-that of the prior art. Thus, the picture quality can be remarkably improved.

Figure 5:
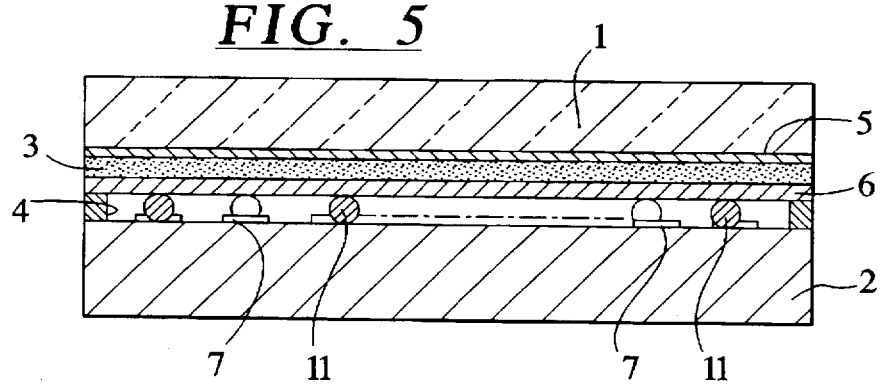
FIG. 5 is an essential part schematic cross sectional view showing another embodiment of an image display device to which an electro-optical device according to this invention is applied.
Figure 6:
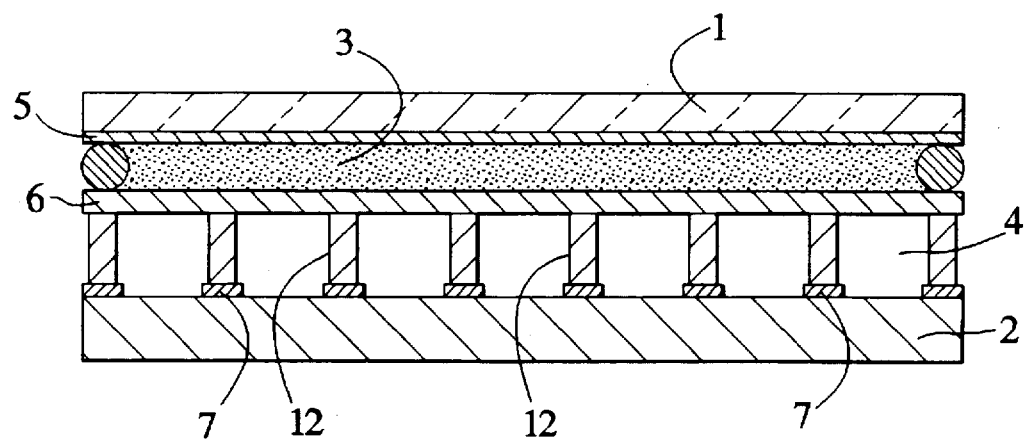
FIG. 6 is an essential part schematic cross sectional view showing a further embodiment of an image display device to which an electro-optical device according to this invention is applied.
Figure 7:
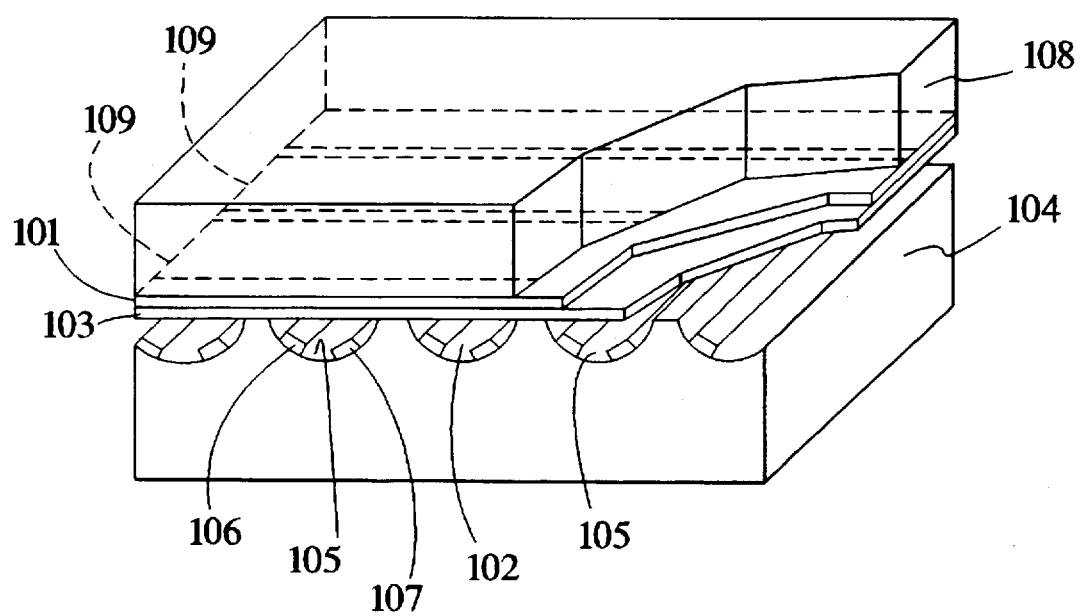
FIG. 7 is an essential part enlarged cross sectional view showing, in a partially broken manner, one example of conventional image display devices.

It is a matter of course that, while explanation has been given in connection with the embodiment to which this invention is applied, this invention is not limited to this embodiment. For example, while the image display device of the above-described embodiment is of the open-cell structure, there may be employed an image display device of a structure such that, for example, as shown in FIG. 5, the gap interval between discharge regions 4 is caused, to be maintained with high accuracy, and to have an improved mechanical strength by fine particle 11 sprayed on the discharge electrodes 7. Alternatively, as shown in FIG. 6, there may be employed an image display device of a structure such that partition walls 12 are formed by the printing method on discharge electrodes 7, thus to divide the discharge region 4 every scanning unit.

As is clear from the foregoing description, when the electro-optical device according to this invention is applied to an image display device, the number of electrodes required for discharge can be reduced to one half. Thus, not only the transmissivity can be improved, but also electrodes can be drawn out with ease.

In addition, when consideration is made in connection with the case where an image display device of this invention and that of the prior art have the same number of electrodes, the number of scanning lines twice greater than that of the prior art can be realized. Thus, resolution can be remarkably improved.

What is claimed is:

1. An electro-optical device comprising:

a first substrate which has a plurality of non-overlapping first electrodes formed on major planar surface thereof;

a second substrate parallel to and opposite the first substrate and which has a plurality of non-overlapping second electrodes formed on a major planar surface thereof, the second electrodes disposed substantially perpendicular to the first electrodes and positioned at equal intervals so that any adjacent second electrodes constitute a pair of anode and cathode electrodes;

a liquid crystal layer positioned between the first and second substrate;

a dielectric material layer positioned between the liquid crystal layer and the second substrate;

a discharge chamber formed between the dielectric layer and the second substrate, and containing an ionizable gas; and means for shifting the pairs of anode and cathode electrodes sequentially.

2. An electro-optical device as claimed in claim 1 further comprising partition walls formed on the second electrodes to support the dielectric material layer.

3. An electro-optical device as claimed in claim 1 wherein said dielectric material layer comprises a glass.

4. An electro-optical device as claimed in claim 2 wherein said partition walls are formed by printing procedures.

* * * * *